United States Patent [19]

Mollett

[11] 4,326,912

[45] Apr. 27, 1982

[54] PROCESS FOR IMPROVING THE QUALITY OF PULP OBTAINED FROM WASTEPAPER

[75] Inventor: Christopher C. Mollett, Brighton, England

[73] Assignee: Pira, The Research Association for the Paper and Board, Printing and Packaging Industries, Surrey, England

[21] Appl. No.: 192,209

[22] Filed: Sep. 30, 1980

[30] Foreign Application Priority Data

Oct. 1, 1979 [GB] United Kingdom ............... 33924/79

[51] Int. Cl.$^3$ ............................................... D21C 5/02
[52] U.S. Cl. ......................................... 162/5; 162/55; 210/702; 209/4
[58] Field of Search ....................... 162/5, 55; 210/733, 210/702; 209/4

[56] References Cited

U.S. PATENT DOCUMENTS

| | | | |
|---|---|---|---|
| 4,013,505 | 3/1977 | Balcar et al. | 162/5 |
| 4,076,578 | 2/1978 | Puddington et al. | 162/5 |
| 4,221,634 | 9/1980 | Frost | 210/702 |

FOREIGN PATENT DOCUMENTS 1920590 12/1969 Fed. Rep. of Germany.
1938434  2/1971 Fed. Rep. of Germany.

*Primary Examiner*—William F. Smith
*Attorney, Agent, or Firm*—Shapiro and Shapiro

[57] ABSTRACT

The method removes a contaminant, such as adhesive or ink particles, from wastepaper pulp. The method includes the steps of dispersing a monomer in the pulp so as to form droplets or beads which take up the particles e.g. by a process in which the particles are coated, absorbed or dissolved by, or adhere to the droplets or beads of monomer. The monomer is then polymerized to increase the rigidity of the droplets or beads, and the droplets or beads are separated from the pulp, e.g. by screening. The monomer or a mixtures of monomers are dispersed in the pulp by strong mechanical agitation and the agitation can be controlled to provide droplets or beads of monomer within a certain size range. Suitable monomers includes styrene, vinyl acetate, methyl methacrylate or mixtures of the same. The viscosity of the monomer phase may be increased by dissolving a homopolymer in the monomer to reduce the effect of shear forces caused by agitation. Benzoyl peroxide may be added to initiate polymerization.

13 Claims, No Drawings

PROCESS FOR IMPROVING THE QUALITY OF PULP OBTAINED FROM WASTEPAPER

This invention relates to the field of recycling wastepaper and provides a method for improving the quality of pulp. The method may be applied principally to remove adhesive contaminants, but it also can be used to remove other contaminants such as printing ink.

Considerable problems are encountered in the recycling of wastepaper, as a direct result of the presence of adhesive contaminants in the wastepaper furnish. The problems may be roughly divided into two main areas. Firstly, those mills producing board suffer from adhesive particles on the back of the board being offset onto the higher quality top surface of the board underneath. This spoils the product and causes difficulty in printing. Secondly, those mills manufacturing fluting and corrugating medium suffer primarily from the deposition of adhesive onto various parts of the machine, necessitating downtime cleaning and lost production.

The types of adhesives (known as hot melts, HM pressure sensitives, PS and hot melt pressure sensitives, HMPS), which cause the difficulties are based on synthetic polymers such as polyvinyl acetate, ethylene+vinyl acetate and styrene+butadiene block copolymers, modified with resins and plasticizers. Natural resins such as casein and dextrin are not a problem.

Previous attempts have been made to disperse the adhesive particles with detergents and solvents, but with very limited success. Also the stock has been treated with material such as talc in an attempt to coat the adhesives with a 'non-sticky' material, but this method has also proven unsatisfactory. The difficulty with screening methods is that the adhesive particles are readily deformed at the temperatures used during processing (commonly 50°-60° C.) and pass through the screens (both holes and slots) with the accepted stock. More recently, some success with regard to removal of the adhesives using cleaners which separate on the basis of the different specific gravities and hydrodynamic shapes of the various materials has been reported. However, the method is costly and clearly will not remove material whose density is the same as or close to that of cellulose itself.

U.K. Patent Specification No. 2001373A describes a process for recycling wastepaper containing particles of bitumen. The process comprises heating and agitating a stock made from this wastepaper in the presence of hydrophobic material, such as a polymer. The stock is heated to a temperature at or above the softening point of the bitumen whereby the bitumen is coated onto the hydrophobic material. It can then be removed by screening. A disadvantage of this method is that it is applicable only with contaminants containing heat sensitive particles having a softening point within an acceptable temperature range. Moreover, the temperature of the content of a reaction vessel must be maintained at, or above the softening point of the bitumen during agitation. The process is also preferably carried out with a surface active agent to promote adhesive of the bitumen particles to the hydrophobic material. It is further preferred to cool the reaction products, for example by the addition of cold water, to harden the bitumen layer adhering to the surfaces of the hydrophobic material to prevent re-dispersion during subsequent stages in the process.

UK Patent Specification No. 1273678 describes a process for de-inking wastepaper. The process involves dispersing a polyolefin or a halogenated polyolefin in an aqueous solution of a surface-active agent. Polymer particles to which the ink becomes attached are separated from the stock by flotation. This process essentially concerns the preparation of a preferential surface for the ink particles. A disdvantage of the processss is that it will not remove all types of ink, such as offset lithographic ink.

The problem facing invention is the efficient removal of contaminant, such as adhesive or ink particles, from wastepaper pulp with minimum fibre loss and fibre damage and without the disadvantages of the prior art.

The invention as claimed provides a solution wherein a monomer is dispersed in the pulp so as to take up the contaminant particles, the monomer is polymerised to produce substantially rigid particles, and the rigid particles are separated from the pulp. The contaminant particles are taken up by a process in which they are coated, absorbed or dissolved by, or adhere to droplets or beads of the monomer which are formed by the dispersion. These effects may occur singly or in any combination depending on the nature of the contaminant and of the monomer.

The main advantages of the invention are that the method is more versatile and hence may be applied to a wider range of contaminants and that it is relatively straightforward to carry out with a very good yield.

In a process which consists of absorbing and/or dissolving adhesive contaminants in globules of a monomeric liquid which are effectively immiscible with the aqueous phase of the pulp suspension, the monomer is either polymerized subsequently or during absorption/solvation phase of the treatment. Solvation may be the prime effect, i.e. whilst the monomer is still a relatively non-viscous liquid in the initial phase of the reaction. As polymerisation proceeds the viscosity of the monomer/polymer mixture increases and the adhesive may be absorbed by monomer/polymer droplets. In the final phase of the reaction, the semi-rigid polymer only permits contaminant particles to adhere to the bead surface.

The monomer is polymerized by a free-radical mechanism by a method (or methods) analogous to that of suspension polymerization but which differs in cerain respects, namely:

1. the presence of pulp,
 2. the fact that no suspending agent is required,
 3. the much lower monomer/water ratio,
 4. the use of reaction accelerators, and
 5. reduced reaction temperature.

The final product is an agglomerate of polymer and adhesive material in the form of spherical (or near spherical) rigid beads, which can be separated from the pulp by conventional cleaning methods. The size distribution is determined by the consistency of the pulp suspension, the degree of agitation and the viscosity of the monomer preparation added to the stock.

The actual choice of monomer, initiator and accelerator compounds are manyfold within certain restrictions namely, the monomer must be effectively immiscible with water (i.e. it may be inherently insoluble, or its solubility may be suppressed by carrying out the reaction in acidic or alkaline media or by adding simple electrolytes) and the initiator should be soluble in the monomer phase and preferably not in the aqueous phase. Ideally the accelerator should be soluble only in the monomer phase although accelerators which do dissolve in water are effective.

In general, either a monomer, or a mixture of monomers can be dispersed in the pulp, for example, by strong mechanical agitation, to form droplets suspended in a liquid phase in which both the monomer or monomers and the products of polymerisation are essentially insoluble. Preferably, agents are added with hinder coalescence of monomer droplets during polymerisation. Oxygen is preferably removed, for example, by displacement by nitrogen, from the monomer phase, so that polymerisation is not later inhibited.

Preferably, the pulp has a consistency of 0.1 to 3.0% but the consistency may be as high as 5%. Mill pulping generally falls within the range of 3 to 5% consistency (i.e. 3 to 5 gms dry fibre to 100 mls water).

The ratio of monomer to liquid (e.g. water) may be in the range of 1:100 to 1:2000 by volume.

Suitably, polymerisation is initiated by the addition of a initiator of approximately 1% by weight of the added monomer. The only restraint on the initiator is that it is soluble in the monomer phase.

The selection of monomer type depends on the required reaction rate and also on the affinity and solubility of the contaminant particles, e.g. adhesive particles, within the monomer phease. Suitable monomer include styrene, vinyl acetate, methyl methacrylate, or mixtures of the same. The inclusion of vinyl acetate is desirable to improve the solubility of ethylene-vinyl acetate, which is a commonly used copolymer in adhesive.

A suitable polymerisation initiator is benzoyl peroxide, but other initiators may be used, in particular to optimise the reaction rate.

A suitable reaction temperature is about 80° C., but it could differ from this value, bearing in mind that excessive temperatures will cause cellulose fibre degradation. However, the reaction is normally exothermic and a cooling jacket may be required to regulate the reaction temperature.

A suspending agent is not normally required probably due to the presence of the pulp. However, since shear forces are generated by agitating the viscous mixture, there may be a tendency for monomer droplets to be dispersed to an extent that very small polymer particles are formed. The viscosity of the monomer phase can be initially increased by dissolving a homopolymer in the monomer to reduce the effect of shear forces. This would also enable the "recycling" of at least some of the products of the treatment to reduce costs. Moreover, section of the monomer may enable recovery by pyrolysis of the polymer, for example methyl methacrylate, for monomer recycling.

Whilst the method is particularly suitable for removing adhesive contaminants, especially those based on synthetic polymers, it is also applicable to remove ink particles. In fact, the method may be applied to remove both of such contaminants in the same process. The normal prior method for removing ink is by flotation or washing processes.

The degree of agitation to disperse the components of the mixture affects the particle size. Thus, agitation may be controlled to provide polymerisation products of a suitable size for removal.

Removal of the products of polymerisation may be effected by screening and or centrifugal cleaning.

The general method of the invention is exemplified by a process in which a pulp suspension containing adhesive contaminants is agitated in an enclosed vessel at atmospheric pressure. Monomer, which has been degassed by distillation and by bubbling $N_2$ gas through the liquid, is added to the initiator. When the initiator has dissolved, a known amount of accelerator is added and the solution added to the pulp suspension. When polymerization is complete the products of polymerization are then removed by screening and/or centrifugal cleaning. The reaction conditions and chemical dosages are discussed below along with some practical examples.

On an industrial scale, high pulp consistencies are preferable. However, the constraints on increasing consistency are those of adequate mixing (i.e. sufficient encounters between adhesive and monomer), and the effect on the size distribution of the polymerized monomer particles of high pulp consistencies, where shear forces generated by the pulp reduce the volume of individual monomer globules and, hence, product polymer beads. The maximum operable consistency can be determined by trial and experiment but we have successfully operated the reaction at pulp consistencies of some 2% (dry fibre to water). Some leeway can be achieved by varying the viscosity of the monomer either by dissolving polymer prior to addition, or prepolymerizing until the desired viscosity is obtained.

With regard to the hydrodynamic conditions, the degree of agitation, the paddle and reactor design, are such as to produce optimum results. These factors affect the efficiency of the system and the size distribution of the product beads, the latter being important in the eventual removal of the converted adhesive. Suitable hydrodynamic conditions can be determined by trial and experiment and can be readily determined by those skilled in the art without departing from the invention.

In the process of suspension polymerization a distribution of bead sizes (i.e., product polymer) is obtained. The size of the final bead is determined by the size of the liquid monomer droplets at the start of the polymerization. Consequently, any factors which affect the size of the monomer droplets, will affect the size of the product beads. The droplets and hence the beads are not all the same size, particularly when in the presence of pulp as this will tend to increase the spread of bead sizes. The basic objectives of a process according to the invention are to encapsulate a contaminant under suitable reaction conditions of time, temperature and consistency, so as to produce a satisfactory bead distribution which facilitates complete removal of the polymerization product. Thus the bead distribution is preferably as narrow as possible and lies about a mean size value which is large enough to ensure complete removal (an alternative would be to alter the density of the product such that the centrifugal cleaning would be much more efficient).

The factors which affect bead size and distribution are external forces such as agitation and pulp consistency. In conventional suspension polymerization processes, temperature, initiator concentration and water to monomer ratio are also important, but are believed to be insignificant in the present process.

With regard to dose rate, experiments indicate that typical hot melt and hot melt pressure sensitive adhesives are soluble in suitable monomers at levels between 1 g ml$^{-1}$ and 2 g ml$^{-1}$ or greater at 60° C. depending on the particular monomer selected. Mixtures of monomers can also be used for enhanced solvating power. This implies that a stock containing 0.1% by weight adhesive would require approximately 500 ml to 1000 ml of monomer per metric ton. Examples are given in Section 4 of typical dose levels used in laboratory scale experiments. Calculations have been made giving an estimate of the collision frequency of monomer and adhesive particles which is an important factor in determining the efficiency of the process. These indicate that the laboratory scale experiment, when using higher levels of adhesive contaminant (10%), but of greater particle size, does not give collision frequencies significantly greater than those for a large scale treatment (0.1% adhesive of much smaller particle size) if equal relative velocities of adhesive and monomer are assumed for both systems.

Considering viscosity effects, it is advantageous to increase the viscosity of the monomer prior to addition to the contaminated stock under certain conditions (e.g. high consistency). This may be achieved by dissolving polymer, obtained from a previous treatment, until the required viscosity is produced. Alternatively, the polymerization may be initiated in bulk prior to addition of the monomer to the stock. A combination of the two modifications to the process may be the most suitable method. However, it must be noted that modification of the viscosity will reduce the amount of adhesive which can be absorbed per unit volume of monomer, thus increasing the dose rate. Another advantage of prepolymerization is that it enables the monitoring of the process and ensures that polymerization has been initiated prior to addition, which reduces the possibility of any inhibition due to extraneous matter in the wastepaper pulp suspension.

The temperature at which the treatment is applied is variable and depends primarily on two factors:
  (i) the optimization of adhesive absorption by the monomer droplets,
  (ii) the minimization of the total treatment time.

Clearly an important factor governing the reduction of the overall treatment time is the rate of polymerization. The ideal is the lowest possible temperature and the shortest possible treatment time. Whilst the temperature and time can be reduced by the use of accelerators, which increase the rate of polymerization, there are threshold values of both time and temperature. These can be optimized by trial and experiment and may fall within the ranges 20–30 min and 35°–45° C. respectively. It is the time and temperature required to fully absorb the adhesive within the monomer droplets which limit the process rather than the rate of polymerization. Obviously, these limits could be lowered at the expense of increasing the addition of monomer. This is purely a matter of economics.

Suitable water insoluble monomers for use in the invention include:
  methyl methacrylate
  styrene
  vinyl acetate
  divinyl benzene
  alkyl acrylates Factors affecting monomer selection are:
  (i) water insolubility
  (ii) ability to absorb adhesive
  (iii) polymerization rate
  (iv) rigidity of product
  (v) melting point of product
  (vi) toxicity of monomer Methyl methacrylate is preferred because it fulfils all the constraints listed and has a lower toxicity than the aromatic monomers. However, it is partially water soluble, although this is easily suppressed by carrying out reaction in acidic or alkaline media or by adding simple electrolytes. Some of the lower alkyl acrylates give greater rates of reaction and better size distribution but are less acceptable because of the rather offensive smell of the monomer. It is important to note, however, that whichever monomer is selected, the treatment must be carried out in an enclosed vessel to achieve virtually complete (95%) monomer conversion. The list of monomers given is not intended to be a complete catalogue of potentially applicable monomers.

Suitable monomer soluble initiators for use in the invention include:
  azoisobisbutyronitrile
  organic peroxide and hydroperoxides.

The important criterion for initiator selection is that polymerization is only initiated in the polymer phase and not in the aqueous phase.

Suitable accelerators for use in the invention may be commonly based on substituted amines and anilines, although other accelerators may be usable. A typical accelerator is Di-(4-dimethylaminophenyl)-methane. A more complete list of free radical polymerization accelerators is given by Hurdis in U.S. Pat. Nos. 2,467,033, 2,449,299 and 2,450,552. The mechanism by which these accelerators work is thought to involve enhanced decomposition of the peroxide initiator producing reactive amine radicals and increasing the rate of initiation and hence polymerization.

The invention is exemplified by the following typical experiments.

Experiment 1

A known proportion of adhesive contaminant was coated onto a paper substrate and the substrate was disintegrated and made up to a pulp having a consistency of 1%. The pulp was placed in a three-necked flask fitted with a mechanical stirrer, reflux condenser and a nitrogen inlet tube. Monomer was then added, the mixture was stirred and nitrogen was bubbled through the mixture to remove oxygen (which is an inhibitor to the reaction). The ratio of monomer to water was 1:160. This is much lower than those (1:3) used in commercial suspension or bead polymerization processes (e.g. based on processes described by W. Bauer and H. Lauth, Ger 656, 134; Rohm and Haas, Darmstadt 1931).

A polymerization reaction was then initiated by the addition of a polymerization initiator in the amount of approximately 1% by weight of the added monomer. As the reaction proceeded by a free-radical mechanism, the globules of monomer were transformed into rigid spheres of polymer containing the adhesive particles. The particles were then screened from the pulp. Between about 30 and 70% conversion, the globules pass through an adhesive stage so stirring was maintained to prevent coalascence and a large build up of polymer on the stirrer. A suspending agent was unnecessary, probably due to the presence of the pulp.

Experimental results showed that for a 5 g sample of stock containing approximately 200 adhesive particles (50:50 hot melt to hot melt pressure sensitive) all adhesive particles are removed by the above treatment.

It is pertinent to note that the contaminant level, which is being successfully treated, is at least 10–100 times greater than the levels generally encountered in the industrial environment. Results for furnishes containing ink particles clearly demonstrate that considerable quantities of ink are also removed during treatment and are found sorbed by the spheres of polymer. The reaction time and the dosage levels can be determined to fully clean the pulp. The results also indicated that fibre loss was minimal, the polymerised spheres being effectively free of fibre.

Experiments 2, 3 and 4 below were conducted along similar lines to experiment 1 and only the differences have been noted.

Experiment 2

Pulp 100 g containing 10% by weight of adhesive:

| Monomer | 4 ml methyl methacrylate |
| | 5 ml styrene |
| Viscosity modifier | 1.7g polystyrene |
| Initiator | 0.1g benzoyl peroxide |
| Temperature | 70° C. |
| pH | 6 |
| Treatment time | 20 min |

Complete removal of adhesive.

Experiment 3

| Unbleached reject pulp | 100g reject waste from mill |
| Monomer | 5 ml methyl methacrylate |
| Initiator | 0.1g benzoyl peroxide |
| Temperature | 70° C. |
| pH | 6 |
| Treatment time | 20 min |

Complete removal of adhesive plus other contraries.

Experiment 4

| Bleached pulp | 100g 10% by weight adhesive |
| Monomer | 10 ml methymethacrylate |
| Iniator | 0.1g |
| Accelerator | 0.02g |
| Temperature | 35° C. |
| Treatment time | 20 min |

Complete removal of adhesive.

The experimental method is not necessarily rigidly defined, for example, it may be advantageous to add half the monomer uninitiated to absorb adhesive, then add the remainder of monomer and initiator and accelerator to complete the reaction.

The experimental results demonstrate that the process can be successfully applied both to laboratory prepared furnishes and to contaminated mill stocks. Under suitable conditions removal is complete, indeed considerable quantities of other contrary material was removed in experiment 3, including plastic and other synthetic debris, tin foil and ink particles. The results in Table 1 show the extent of removal of adhesive particles for some of the mill samples tested. Results for samples of pulp treated by the process and samples undergoing comparable periods of stirring at identical temperatures and consistencies when no monomer is present, show that the strength properties of finished handsheets are but deleteriously affected by the process (Table 2).

Also, the nature of the process enables leaching of adhesive from adhesive-fibre agglomerations, thus ensuring complete removal and no danger of adhesions to rollers in the drying section of the paper machine. This is an important advantage as some difficulty has been encountered with other systems for removing adhesives when the adhesive particles are effectively covered by fibres.

TABLE 1

Treatment of mill stocks taken from the input to the secondary stage cleaners

| Experiment | | No. of adhesives | |
| | | Before treatment | After treatment |
| --- | --- | --- | --- |
| 3 | } same sample | 194 | 0 |
| 3 | | 194 | 0 |
| 3 | different sample | 162 | 0 |
| 3 | different sample | 100 | 0 |

TABLE 2

Strength properties of treated sheets

| | Breaking length km | Burst kPam$^2$ g$^{-1}$ |
| --- | --- | --- |
| KLS untreated | 3.00 | 1.71 |
| KLS treated without chemical addition | 2.96 | 1.77 |
| KLS full treatment | 2.95 | 1.72 |

No residual monomer has been detected in finished handsheets after treatment of the pulp. Furthermore, there is no measurable occlusion of fibre within the polymer beads indicating minimal fibre loss as a result of the treatment. Energy requirements should also be acceptably low, particularly when reaction accelerators are used enabling reaction temperatures of some 35°–45° C. to be employed.

I claim:

1. A method for improving the quality of wastepaper pulp containing contaminant particles, comprising the steps of dispersing a monomer in the pulp so as to form droplets or beads which take up said contaminant particles and chemically polymerizing said monomer to increase the rigidity of said beads or droplets; said beads or droplets being subsequently removed with the contaminant particle from the pulp.

2. A method according to claim 1, wherein said monomer is one of a mixture of monomers dispersed in the pulp.

3. A method according to claim 1 or 2, wherein said monomer or monomers are selected from the group consisting of styrene, vinyl acetate, methyl methacrylate, and mixtures of the same.

4. A method according to any claim 1, wherein said monomer or monomers are dispersed by mechanical agitation.

5. A method according to claim 4 wherein said agitation is controlled to provide said droplets or beads within a certain size range.

6. A method according to claims 4 wherein the viscosity of the monomer phase is initially increased by dissolving a homopolymer in the monomer to reduce the effect of shear forces caused by agitation.

7. A method according to claim 1, wherein an agent is added to hinder coalescence of said beads or droplets during polymerization.

8. A method according to claim 1, wherein oxygen is removed from the monomer phase to avoid inhibition of polymerization.

9. A method according to claim 1, wherein polymerization is initiated by the addition of an initiator of approximately 1% by weight of said monomer or monomers, the initiator being water insoluble.

10. A method according to claim 9, wherein the initiator is benzoyl peroxide.

11. A method according to claim 1, wherein said monomer or monomers are selected to enable recovery by a subsequent treatment of the polymerization products.

12. A method according to claim 1, wherein the ratio of monomer to liquid in the pulp is in the range of 1:100 to 1:2000.

13. A method according to claim 1, wherein the pulp has a consistency in the range of from 0.1 to 3.0%.

* * * * *